(12) United States Patent
Orf et al.

(10) Patent No.: US 8,706,970 B2
(45) Date of Patent: Apr. 22, 2014

(54) DYNAMIC CACHE QUEUE ALLOCATION BASED ON DESTINATION AVAILABILITY

(71) Applicant: International Business Machines Corporation, Armonk, NY (US)

(72) Inventors: Diana L. Orf, Somerville, MA (US); Robert J. Sonnelitter, III, Wappinger Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/670,904

(22) Filed: Nov. 7, 2012

(65) Prior Publication Data

US 2013/0067169 A1      Mar. 14, 2013

Related U.S. Application Data

(63) Continuation of application No. 12/821,714, filed on Jun. 23, 2010.

(51) Int. Cl.
*G06F 12/08* (2006.01)

(52) U.S. Cl.
USPC ............... 711/122; 711/141; 711/E12.024; 711/E12.026

(58) Field of Classification Search
USPC .......... 711/167, 118, 119, E12.001, 122, 141, 711/E12.026
See application file for complete search history.

(56) References Cited

U.S. PATENT DOCUMENTS

| | | | |
|---|---|---|---|
| 7,360,035 B2 * | 4/2008 | Jenkins et al. | 711/150 |
| 8,359,335 B2 * | 1/2013 | Coker et al. | 707/802 |
| 2005/0246481 A1 | 11/2005 | Rohit et al. | |
| 2007/0050564 A1 * | 3/2007 | Gunna et al. | 711/146 |

\* cited by examiner

*Primary Examiner* — Pierre-Michel Bataille
(74) *Attorney, Agent, or Firm* — Cantor Colburn LLP; John Campbell

(57) ABSTRACT

An apparatus for controlling operation of a cache includes a first command queue, a second command queue and an input controller configured to receive requests having a first command type and a second command type and to assign a first request having the first command type to the first command queue and a second command having the first command type to the second command queue in the event that the first command queue has not received an indication that a first dedicated buffer is available.

6 Claims, 4 Drawing Sheets

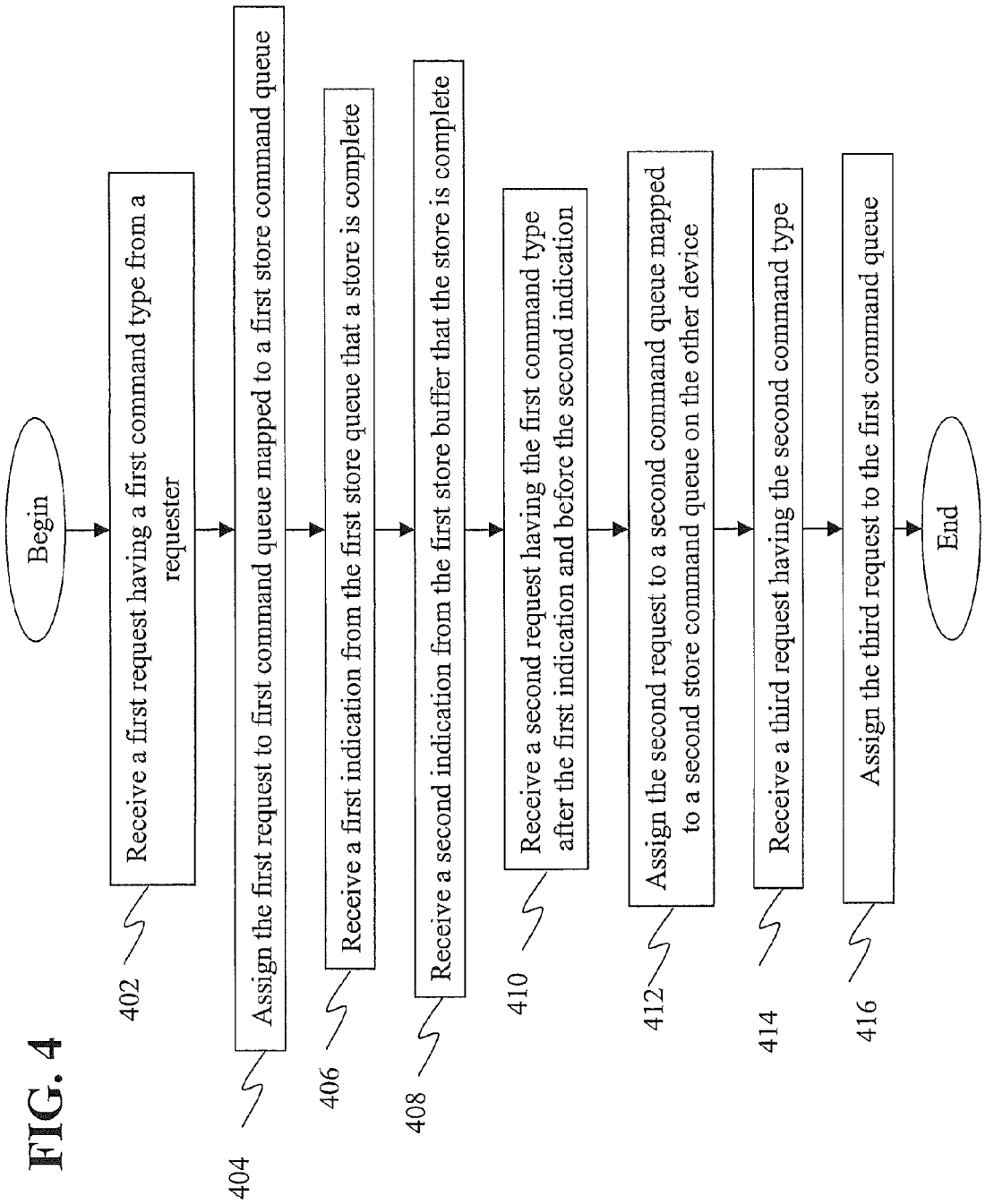

DYNAMIC CACHE QUEUE ALLOCATION BASED ON DESTINATION AVAILABILITY

CROSS-REFERENCE TO RELATED APPLICATIONS AND PRIORITY CLAIM

This application is a continuation of U.S. Non-Provisional application Ser. No. 12/821,714, entitled "DYNAMIC CACHE QUEUE ALLOCATION BASED ON DESTINATION AVAILABILITY", filed Jun. 23, 2010, which is incorporated herein by reference in its entirety.

BACKGROUND

This invention relates generally to processing within a computing environment, and more particularly to managing command queues in a multilevel cache hierarchy.

In computers, a cache is a component that improves performance by transparently storing data such that future requests for that data can be served faster. The data that is stored within a cache might be values that have been computed earlier or duplicates of original values that are stored elsewhere (e.g. main memory). If requested data is contained in the cache (cache hit), this request can be served by simply reading the cache, which is comparably faster. Otherwise (cache miss), the data has to be recomputed or fetched from its original storage location, which is comparably slower.

The operation of cache operations in a shared cache are controlled by a cache controller. The cache controller may include a shared pipeline that processes individual requests. A pipeline may be considered as a set of data processing elements connected in series, so that the output of one element is the input of the next one. An instruction pipeline may be used in a computing device to increase instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

Caches that employ a pipeline, typically is a pool of command queues that are available to process commands received from another unit or chip. These queues may be able to process several different varieties of commands and are generally loaded in a fixed rank-based ordering scheme for simplicity. In such a system, different commands may require access to different secondary resources (e.g., other chips or devices) and if these resources are unavailable the command queue is forced to wait until they are available. In some cases, the different command queues may have access to different secondary resources.

BRIEF SUMMARY

An embodiment of the present invention is directed to an apparatus for controlling operation of a cache that includes a first command queue mapped to a first external command queue that includes a first dedicated buffer. The first command queue is configured to process a first command type that requires use of the first dedicated buffer and a second command type that does not require use of the first dedicated buffer. The apparatus of this embodiment also includes a second command queue mapped to a second external command queue that includes a second dedicated buffer and an input controller configured to receive requests having the first command type and the second command type. The input controller of this embodiment is configured to assign a first request having the first command type to the first command queue and a second command having the first command type to the second command queue in the event that the first command queue has not received an indication that the first dedicated buffer is available.

Another embodiment of the present invention is directed to a memory system that includes a main memory configured to store data and including a first memory store command queue having a first store buffer and a second memory store command queue having a second store buffer. The memory of this embodiment also includes a first cache and a second cache coupled between the first cache and the main memory. The second cache includes a first command queue mapped to the first memory store command queue and configured to process a first command type that requires use of the first store buffer and a second command type that does not require use of the first store buffer. The second cache also includes a second command queue mapped to the second memory store command queue and an input controller configured to receive requests from the first cache having the first command type and the second command type. The input controller is configured to assign a first request having the first command type to the first command queue and a second command having the first command type to the second command queue in the event that the first command queue has not received an indication that the first store buffer is available.

Another embodiment of the present invention is directed to a method of assigning requests to command queues in a cache controller. The method includes: receiving a first request having a first command type from a requester, the first command type requiring access to a store buffer on another device; assigning the first request to first command queue mapped to a first store command queue on the other device, the first store queue having first store buffer; receiving a first indication from the first store queue that a store is complete; receiving a second indication from the first store buffer that the store is complete, the second indication being received after the first indication; receiving a second request having the first command type after the first indication and before the second indication; assigning the second request to a second command queue mapped to a second store command queue on the other device; receiving a third request having the second command type after the first indication and before the second indication; and assigning the third request to the first command queue.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 4 depicts a flow chart of a method according to one embodiment of the present invention.

DETAILED DESCRIPTION

Figure 1:
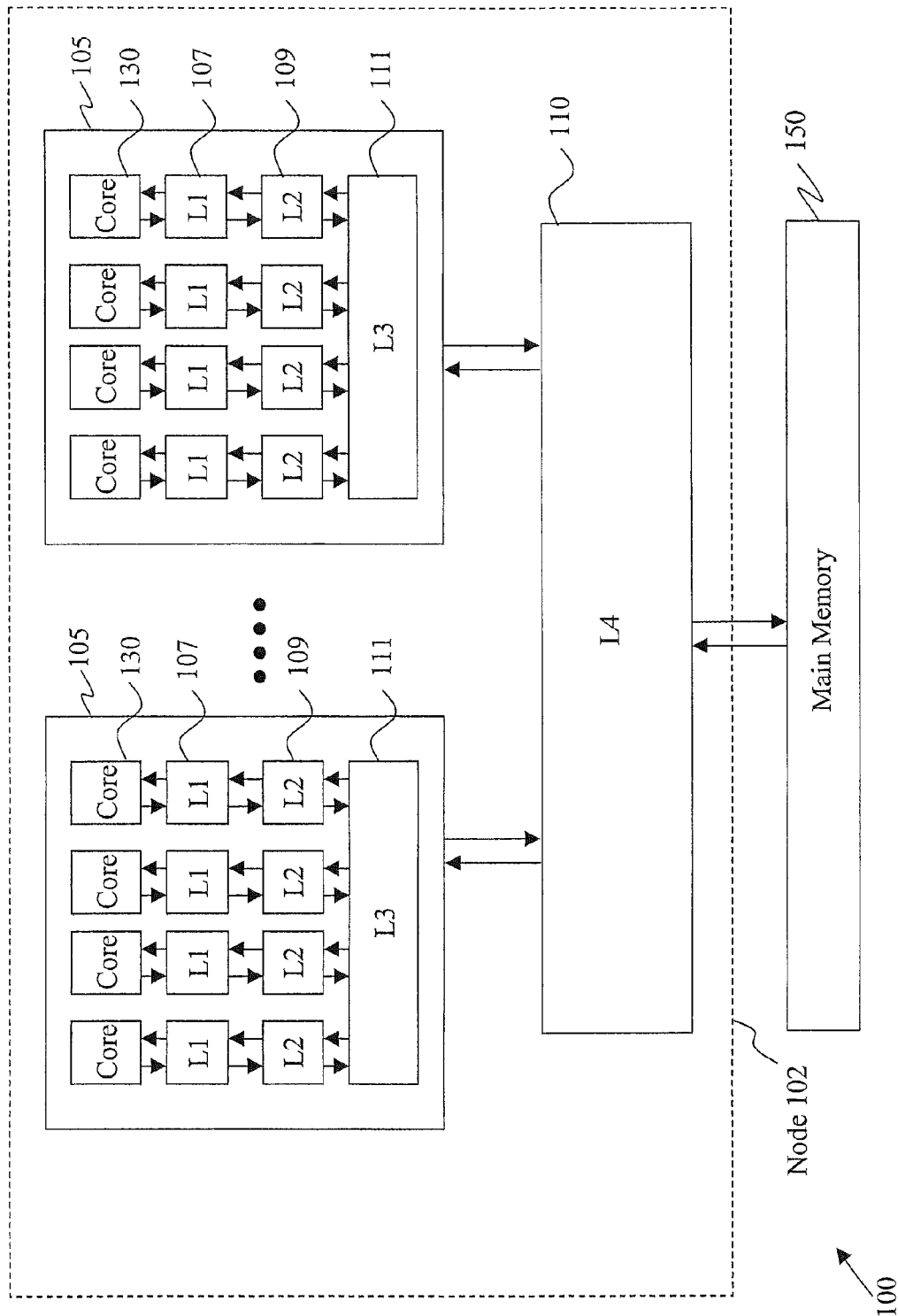
FIG. 1 depicts an example of system on which embodiments of the present invention may be implemented.

FIG. 1 illustrates an example of a computing system 100 according to one embodiment. The system includes one or more nodes 102. In one embodiment, the system 100 may include four nodes 102. In a computing system, multiple nodes 102 may be operatively connected to one another for communicating such as making and responding to requests, as understood by one skilled in the art.

Each node 102 includes one or more central processors 105. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107.

The node 102 also includes one or more L4 caches 110. The L4 caches 110 are operatively coupled to two or central processors 105. In this manner, the L4 caches 110 are shared by multiple L3 caches 111. The system 100 may also include main memory 150 operatively coupled to the L4 caches 110.

In one embodiment, the L3 caches 111 and L4 cache 110 are formed of embedded dynamic random access memory (DRAM) which is referred to as eDRAM. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 KB, the L2 caches 109 are 1.5 MB, the L3 cache 111 is 24 MB and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple requesters have access to a shared cache and the shared cache is one of a plurality of shared caches that have access to another shared cache.

The L3 cache 111 is a departure from prior schemes in that it introduces a shared cache between the L2 109 and L4 110 caches. That is, in the prior art, the L2 caches 109 were coupled directly to the L4 cache 110. Accordingly, in the prior art, the L4 cache 110 was both the point of coherency for the node 102 and the source of its data.

In one embodiment, the L2 cache 109 is a write-through cache. Thus, any change in the L2 cache 109 is immediately updated in the L3 cache 111. The L3 cache 111, on the other hand, is a write back cache. Thus, changes in the L3 cache 111 are not updated to the L4 cache until requested by the L4 cache 110 (e.g., the L4 cache 110 requests that the L3 cache 111 invalidate a line) or the L3 cache 111 is changed such that the line is invalidate (e.g., the L3 cache 111 swaps out the line).

Given that the L3 cache 111 is a write back cache and may source data to L2 caches 109, there are instances where the L4 cache 110 may not include the most up to date data contained in the L3 cache 111. In such instances, to maintain coherency, in the event that the L4 cache 110 receives an access request for data on a particular cache line (or a portion thereof) from main memory 150 it must first query the L3 cache 111 to determine if it has an updated copy of the data and send coherency updates to the lower level caches if the L4 cache 110 requires the L3 cache 111 to change its state with respect to cache line. These requirements may add latency to all requests to the L4 cache 110, which now must go through the extra step of communicating with the L3 cache 111 before responding to a request.

Figure 2:
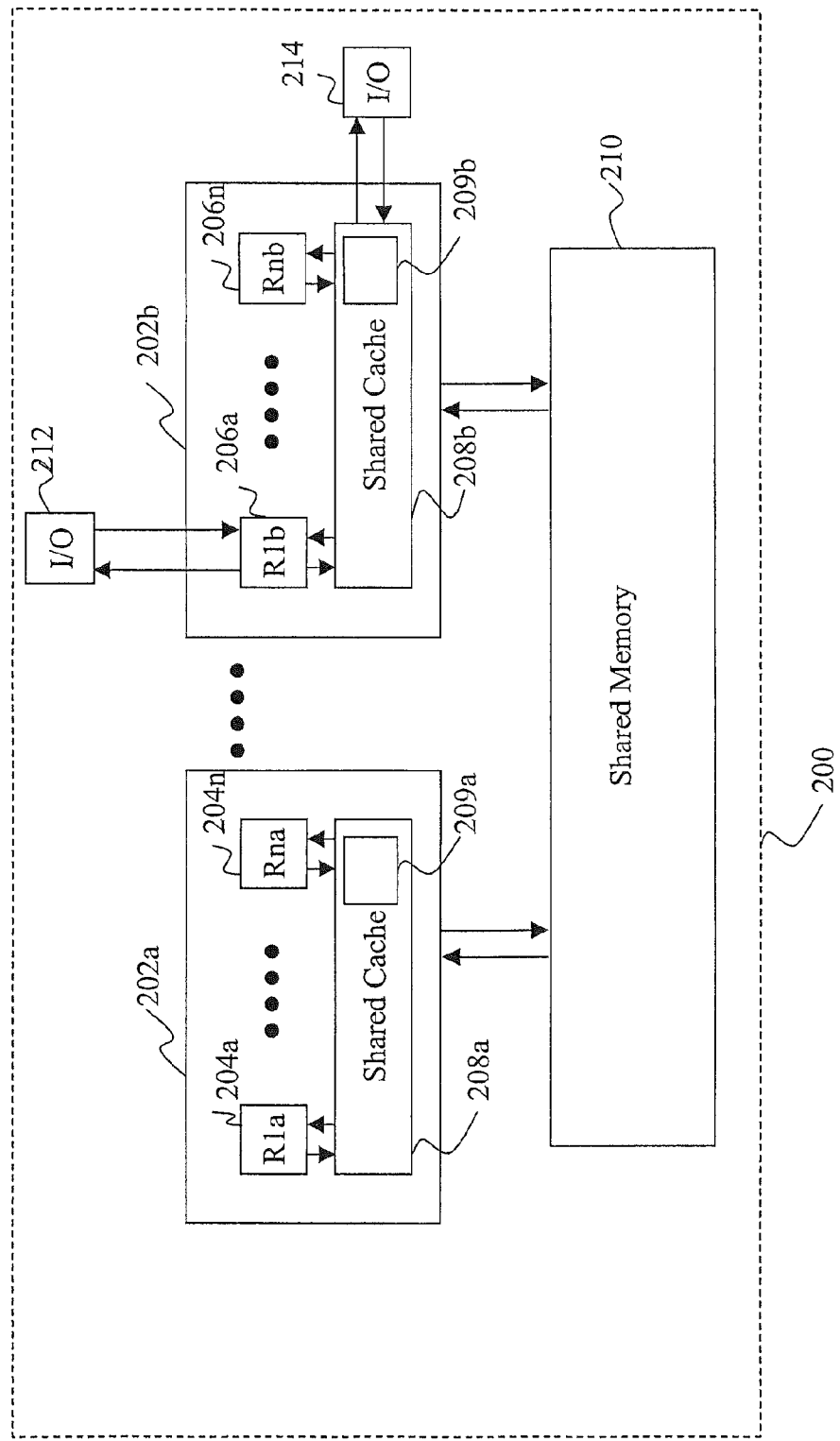
FIG. 2 depicts an alternative embodiment of a system on which embodiments of the present invention may be implemented.

FIG. 2 illustrates an alternative embodiment of a node 200. In this embodiment, the node 200 includes one or more central processors 202a . . . 202b. Each central processor 202 includes a shared cache 208 that includes a shared cache controller 209. The node also includes a shared memory 210 that may be accessed by each of the shared caches 208.

In general, the shared caches 208 receive requests for information (including both data and instruction requests) and if the requested data is contained in the shared caches 208 (cache hit), this request can be served by simply reading the shared cache 208. Otherwise, a cache miss occurs and the data is requested from shared memory 210. The determination of whether a cache hit or miss exists and the general operation of the shared cache 208 is controller by the shared cache controller 209. Of course, any of the caches described herein may include a cache controller.

In one embodiment, the shared cache controller 209 is implemented to include a pipeline and other elements. The shared cache controller 209 may also be responsible for coherency checking. In one embodiment, the shared caches 208 are write back caches.

In more detail, each shared cache 208 is coupled to two or more requesters. For example, shared cache 208a is coupled to requesters 204a . . . 204n and to shared memory 210, all of which may issue requests to the shared cache 208a. For example, shared memory 210 or requestors 204a . . . 204n may request a copy of a particular cache line contained in shared cache 208a. In one embodiment, the requestors 204a . . . 204n are caches. However, the requestors may include other types of device. For example, requestor 206a . . . 206n are coupled to shared cache 208b in central processor 202b. In one embodiment, requestor 206a is an I/O device controller and is coupled to an I/O device 212. The I/O device 212 may be located on a separate chip than central processor 202b. Of course, some I/O devices may include internal drivers and may be directly coupled to the shared cache 208b. One or ordinary skill will realize that other embodiments where a shared cache 208 is coupled to a shared memory 210 and to two or more other requestors, regardless of whether the other requestors are on the same chip as the shared cache, are within the scope of the present invention.

Figure 3:
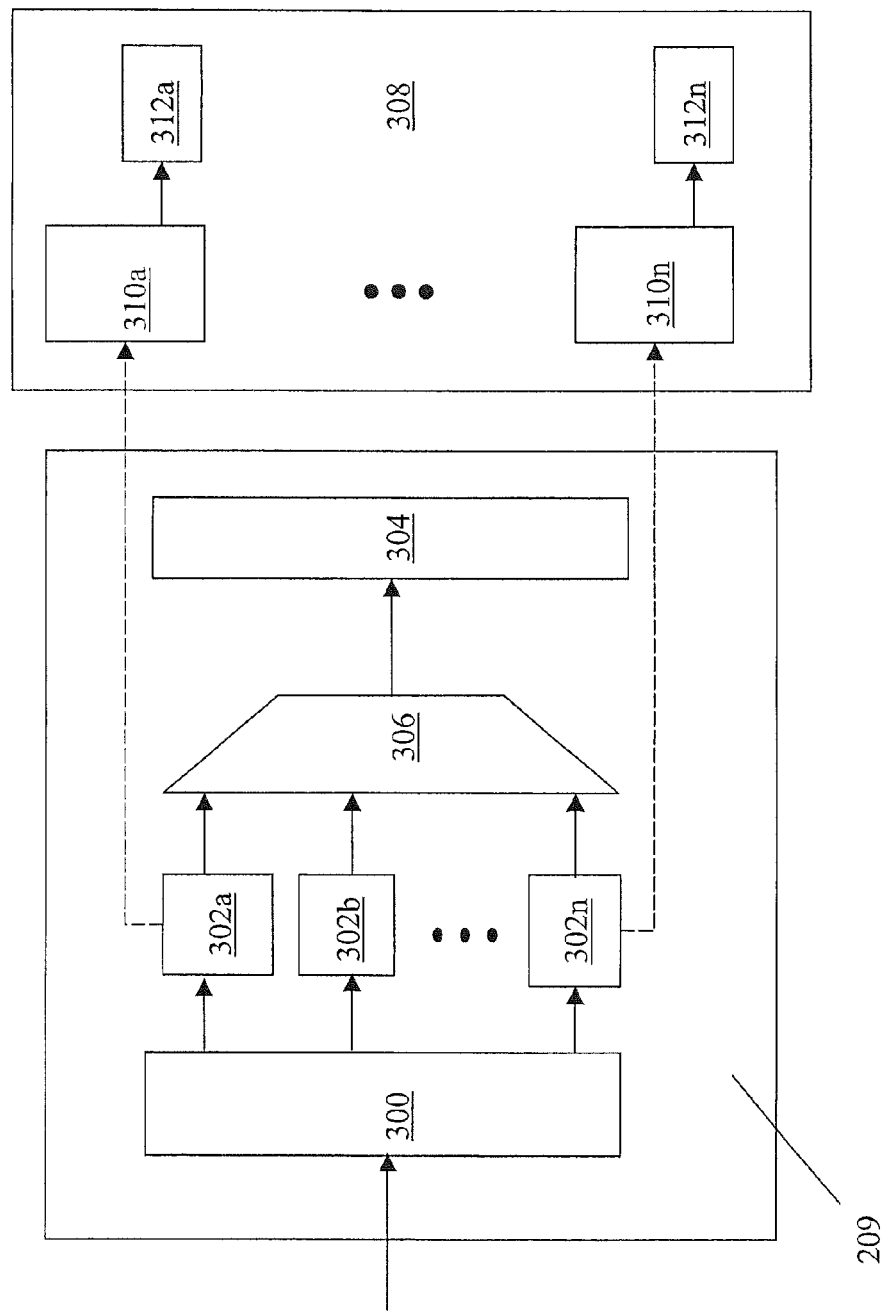
FIG. 3 depicts a cache controller coupled to an external device where certain command queues have access to specific input queues.

FIG. 3 shows an example of cache controller 209 of a shared cache coupled to an external device 308. The external device may be any type of external but, in one embodiment, the external device is main memory in a computing system.

The cache controller 209 includes one or more command queues 302a ... 302n. The command queues 302 are assigned operations received from an external location (e.g., shared memory 210 of FIG. 2) or originated on the shared cache on which the cache controller is resident by an input controller 300. Regardless of where received from, the command queues 302 process the operation and may produce one or more instructions to be performed by the shared pipeline 304. The command queues 302 may be able to process two or more different types of commands. Each instruction may require access to a resource. For example, the instruction may require access to a command queue located on another cache or device. In more detail, the instruction may be a memory transfer from a first external to an external device through the cache on which the cache controller 209 is located.

In this embodiment, one or more of the command queues 302 are mapped to command queues 310 in the external device 308. For example, command queue 302a is mapped to command queue 310a and command queue 302n is mapped to command queue 310n. Each command queue 310 in the external device includes its own dedicated buffers 312. In one embodiment, the external device 308 is a main memory in a computing system and the command queues 310 are used to process stores to the main memory.

An example is instructive. In this example, the external device 308 is a memory and the command queues 310 are used to process stores to the memory. As discussed above, each command queue 310 includes a dedicated buffer 312. Each dedicated buffer can provide signals indicating where or not it is available to the command queue 302 that it is mapped to. In this example, the cache controller 209 has received a request store data from a requester (e.g., from L4 110, FIG. 1) to the external device 308. When one of the command queues 302 of the cache controller 209 sends a store command (via pipeline 304) to the command queue 310 it is mapped to (e.g., when command queue 302a sends a store command to command queue 310a), the command queue 302 typically waits for the other dedicated buffer 312a to signal that it is complete before returning a response to the requester that it is done with a memory transfer. To improve performance, the command queue 310a may provide an indication that it has completed the store before all of the data is moved from the buffer 312 into the final destination in memory. This allows the command queue 302 to signal it is done to the requester and may be reloaded with a new operation. If the new operation also requires the use of the buffer just accessed (e.g., buffer 312a), then the command queue 302a cannot send a new store to command queue 310 until buffer 312a is available. In such a case, and assuming another command queue 310 (e.g. command queue 310n) whose buffer 312 is available, then it would be desirable to load that queue with the new store command. The input controller 300, therefore, examines the type of command that is received and the availability of the buffers of the store buffers when making its decision on which command queue 302 to assign the request. For memory store commands, the input controller 300 will ensure that these commands are directed to command queues 302 mapped to command queues 310 whose associated buffer 312 is available, if such a command queue exists. In addition, if the command does not require use of a buffer in the external device 308 (e.g., it is coherency request) then the input controller 300 may cause the command to processed by a command queue 302 mapped to a command queues 310 whose associated buffer 312 is not available.

FIG. 4 depicts a flow chart of a method according to one embodiment. At a block 402 a first request having a first command type from a requester is received. In one embodiment, the first command type requires access to a store buffer on another device. In one embodiment, the first request may be a memory store request.

At a block 404 the first request is assigned first command queue mapped to a first store command queue. In one embodiment, the first store command queue is located on the other device and includes a first store buffer. At a block 406 a first indication from the first store queue that a store is complete is received. At a block 408 a second indication from the first store buffer that the store is complete is received. In one embodiment, and as shown, the second indication (block 408) is received after the first indication (block 406). It shall be understood that the process may end after block 408 according to one embodiment. As such, the processes in the blocks described below are optional and not meant as limiting.

At a block 410 a second request having the first command type is received. In one embodiment, the second request is received after the first indication and before the second indication are received. In one embodiment, the second request is a memory store request. At a block 412 the second request is assigned to a second command queue mapped to a second store command queue on the other device.

At a block 414 a third request having the second command type is received. In one embodiment, the third request is received after the first indication and before the second indication. In one embodiment, the third request is a coherency request. At a block 416 the third request is assigned to the first command queue.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of assigning requests to command queues in a cache controller, the method comprising:
   receiving a first request having a first command type from a requester, the first command type requiring access to a store buffer on an other device;
   assigning the first request to a first command queue mapped to a first store command queue on the other device, the first store command queue having a first store buffer;
   receiving a first indication from the first store command queue that a store is complete;
   receiving a second indication from the first store command queue that the store is complete, the second indication being received after the first indication;
   receiving a second request having the first command type after the first indication and before the second indication;
   assigning the second request to a second command queue mapped to a second store command queue on the other device;
   receiving a third request having the second command type after the first indication and before the second indication; and
   assigning the third request to the first command queue.

2. The method of claim 1, wherein the second request is received before the third request.

3. The method of claim 1, wherein the second request is received after the third request.

4. The method of claim 1, wherein the first and second request are memory store requests.

5. The method of claim 1, wherein the third request is coherency check.

6. The method of claim 1, wherein the requestor is an L4 cache and the other device is main memory in a computing system.

* * * * *